United States Patent Office 3,793,324
Patented Feb. 19, 1974

3,793,324
PREPARATION OF 1,4-DISUBSTITUTED-
2(1H)-QUINAZOLINONES
Max Denzer, 288 Kingston Road,
Lake Parsippany, N.J.
No Drawing. Filed Nov. 18, 1971, Ser. No. 200,141
Int. Cl. C07d 51/48
U.S. Cl. 260—251 QB          7 Claims

ABSTRACT OF THE DISCLOSURE

The preparation of 1-substituted-4-aryl-2(1H)-quinazolinones, e.g. 1-isopropyl-7-methyl-4-phenyl-2(1H)-quinazolinone, by reaction of 2-substituted aminobenzophenone with urea in the presence of a lower carboxylic acid. The quinazolinones are useful as pharmaceutical agents, e.g. as anti-inflammatory and analgesic agents.

---

The present invention relates to the preparation of 1-substituted-4-aryl-2(1H)-quinazolinones from 2-substituted aminobenzophenones by reacting the latter with urea in the presence of a lower carboxylic acid.

The preparation of 1-substituted-4-aryl-2(1H)-quinazolinones by reacting a 2-substituted aminobenzophenone with urea in the presence of a Lewis acid at relatively high temperatures of the order of about 180–200° C. has previously been described but such preparation has been subject to disadvantages and resulted in only moderate yields.

A major object of the present invention is to provide a new and improved process for the preparation of 1-substituted-4-aryl-2(1H)-quinazolinones from 2-substituted aminobenzophenones and urea.

In accordance with the present invention, it has been found that 1,4-substituted-2(1H)-quinazolinones of the General Formula I:

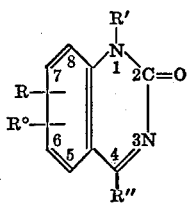

(I)

wherein

R represents hydrogen, halo of atomic weight of from 18 to 80, i.e., fluoro, bromo and chloro; lower alkyl containing 1 to 3 carbon atoms; lower alkoxy containing 1 to 3 carbon atoms; nitro; lower alkylthio of 1 to 3 carbon atoms; or trifluoromethyl;
R° represents hydrogen, halo, lower alkyl or lower alkoxy, as defined above; or
R and R° together represent 6,7-methylenedioxy;
R′ represents lower alkyl containing from 1 to 5 carbon atoms, e.g. methyl, ethyl, propyl, isopropyl, butyl, sec-butyl and isobutyl; cycloalkyl of 3 to 6 carbon atoms; cycloalkylalkyl of 4 to 7 carbon atoms in which the cycloalkyl contains from 3 to 6 carbon atoms; allyl; methallyl; or propargyl, provided that R′ does not represent a tertiary alkyl in which the tertiary carbon atom is attached directly to the ring nitrogen atom;
R″ represents phenyl, or substituted phenyl of the formula

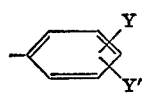

Y represents halo of atomic weight from 18 to 80; lower alkyl containing from 1 to 3 carbon atoms, e.g. methyl, lower alkoxy containing from 1 to 3 carbon atoms, e.g. methoxy; or trifluoromethyl;
Y′ represents hydrogen, halo of atomic weight of from 18 to 80; lower alkyl containing from 1 to 3 carbon atoms, e.g. methyl, lower alkoxy containing from 1 to 3 carbon atoms, e.g. methoxy;

are prepared by cyclizing a 2-aminobenzophenone of the Formula II:

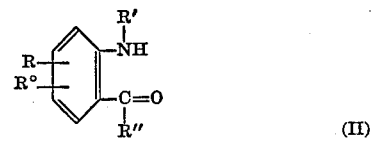

(II)

in which R, R°, R′ and R″ are as defined above, with excess urea in the presence of a lower carboxylic acid at temperatures of at least 80° C.

The reaction of the present invention is carried out at temperatures which are suitably in the range of from at least 80° C. to 160° C., preferably 100° C. to 130° C., and conveniently at the reflux temperature of the reaction system. Higher temperatures can be used, but it is one of the advantages of the present invention that such are not necessary. The high yields which characterize the present invention are obtained when at least 3 mols of urea are employed per mole of compound of the Formula II. The upper limit of the amount of urea employed relative to the compound of the Formula II is not particularly critical and molar excesses of up to 20 or even more times the amount of Compound II may be used without substantially depreciating the high yields obtainable by the process of the invention. Preferably, the mol ratio of urea to Compound II is in the range of from 4:1 to 15:1, more preferably 5:1 to 10:1.

The lower carboxylic acids employed in the process of the invention are the monocarboxylic acids of 2 to 4 carbon atoms, e.g. acetic acid and propionic acid, preferably glacial acetic acid. The lower carboxylic acid is employed as a solvent which also clearly has a beneficial effect on the process of the invention. The amount of the carboxylic acid employed is important in achieving the desired results. At least about 2 mols of acid per mol of urea must be used, preferably 4 to 12 mols. There is no precise upper limit to the amount of acetic acid, but more than 20 mols per mol of urea merely increases the volume of the reaction mixture without accompanying benefit.

In addition to the aforementioned starting materials, other agents such as paratoluene sulfonic acid may be added.

The reaction is carried out until all or substantially all of the aminobenzophenone is consumed, as determined, for example, by analysis of the reaction mixture, as by thin layer chromatography. The reaction time will, of course, depend on the reaction temperatures and the relative proportions of the reactants. Normally, it will range from about 1 to 20 hours.

The product can be recovered from the reaction mixture by conventional methods.

The compounds of Formula II used as starting materials in the foregoing reaction are either known, per se, or can be prepared from available materials by procedures known in the art.

The compounds of structural Formula I are useful because they possess pharmacological activity in animals. In particular, the compounds are useful as anti-inflammatory agents as indicated by the carrageenin-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and mode of administration. However, in general, satisfactory results are obtained when administered at a daily dosage of from about .15 milligram to about 100 milligrams per kilogram of body weight, preferably given in divided doses 2 to 4 times a day, or in sustained release form. For larger mammals, the administration of from about 10 milligrams to about 1000 milligrams of the compound per day provides satisfactory results and dosage forms suitable for internal administration comprises from about 3 milligrams to about 500 milligrams of the compound in admixture with a solid or liquid pharmaceutical carrier or diluent.

The Compounds I of the invention are also useful as analgesics as indicated by application of pressure to yeast-inflamed foot of the rat (oral administration). They are also useful as anti-pyretics as indicated by inhibition of bacterial lipopylsaccharide-induced fever (oral administration). For such uses, the compound may be administered to obtain satisfactory results at dosages and in modes similar to those employed in the treatment of inflammation.

The following examples illustrate the invention. Unless otherwise indicated, temperatures are in centigrade degrees.

EXAMPLE 1

A mixture of 3.036 kg. of 2-N-isopropylamino-4-methyl benzophenone, 5.28 kg. urea and 30.6 kg. glacial acetic acid is heated to reflux (115°) for 4.5 hours. The reaction mixture is concentrated, under vacuum until no more acetic acid distills off, cooled to 50° and dissolved in 15.6 kg. chloroform. The resulting material is cooled to room temperature and washed with water. The chloroform layer is washed and concentrated under vacuum to afford an oil which is crystallized from ethylacetate to obtain 2.75 kg. 1-isopropyl-4-phenyl-7-methyl-2(1H)-quinazolinone, M.P. 140–141°. The filtrate is concentrated, cooled and washed to obtain an additional .17 kg. of the product, M.P. 140–141°. Total yield 87.7%.

EXAMPLE 2

A mixture of 12.7 g. 2-N-isopropylamino-4-methyl benzophenone, 25 ml. of glacial acetic acid, 12.3 g. urea and 2.3 g. p-toluenesulfonic acid is heated at reflux until thin layer chromatography indicates the absence of unreacted benzophenone. After removal of the acetic acid, water and chloroform are added to the reaction mixture which is then made basic with ammonium hydroxide. The chloroform layer is washed with water and the chloroform evaporated to leave an oily residue which is crystallized from ethylacetate and washed with ether to give 1-isopropyl-4-phenyl-7-methyl - 2(1H) - quinazolinone. Yield 70–80%.

Following the procedure of Example 1, but using an equivalent amount of the apprporiate aminobenzophenone there is obtained:

(a) 1-methyl-4-(4 - chlorophenyl)-2(1H)-quinazolinone; M.P. 122–123° C.
(b) 5,7 - dimethyl - 1 - isopropyl - 4 - phenyl - 2(1H)-quinazolinone; M.P. 145°–147° C.
(c) 1 - isopropyl - 4 - (4 - methylphenyl) - 2(1H)-quinazolinone; M.P. 138°–140° C.
(d) 6,7-dimethyl - 4 - (4 - phenyl - 1 - propargyl-2(1H)-quinazolinone; M.P. 170–180° C.
(e) 1 - ethyl - 6 - trifluoromethyl - 4 - phenyl - 2(1H)-quinazolinone; M.P. 214°–215° C.
(f) 1-ethyl-6-nitro-4-phenyl-2(1H)-quinazolinone; M.P. 214°–215° C.
(g) 6-bromo-1-isopropyl-4-phenyl - 2(1H)-quinazolinone; M.P. 142°–143° C.
(h) 1-allyl - 7 - chloro - 4 - phenyl-2(1H)-quinazolinone; M.P. 173–174° C.
(i) 1-isopropyl-6-methoxy-4-phenyl-2(1H)-quinazolinone; M.P. 148–150° C.
(j) 1-isopropyl-7-methyl-4-(4-methoxyphenyl) - 2(1H)-quinazolinone; M.P. 163°–165° C.
(k) 1 - methyl - 4 - (3 - trifluoromethylphenyl) - 2(1H)-quinazolinone; M.P. 165°–167° C.
(l) 1-methallyl - 4 - phenyl-2(1H)-quinazolinone; M.P. 143—143° C.
(m) 6,7 - dichloro - 1 - isopropyl - 4 - phenyl - 2(1H)-quinazolinone; M.P. 191°–194° C.
(n) 1-isopropyl - 4 - (m-fluorophenyl) - 6,7 - methylenedioxy-2(1H)-quinazolinone; M.P. 169°–170° C.
(o) 1 - isopropyl - 4 - phenyl - 6,7 - methylenedioxy-2(1H)-quinazolinone; M.P. 215°–218° C.
(p) 1-isopropyl - 4 - (p-fluorophenyl) - 6,7 - methylenedioxy-2(1H)-quinazolinone; M.P. 238–240° C.
(q) 1-isopropyl - 4 - (m-methoxyphenyl) - 6,7 - methylenedioxy-2(1H)-quinazolinone; M.P. 189–191° C.

What is claimed is:
1. A process for the preparation of a compound of the formula:

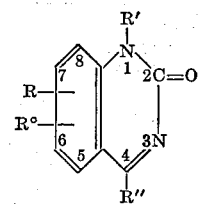

wherein

R represents hydrogen, halo of atomic weight of from 18 to 80; lower alkyl of 1 to 3 carbon atoms; lower alkoxy of 1 to 3 carbon atoms; nitro; lower alkylthio of 1 to 3 carbon atoms; or trifluoromethyl;
R° represents hydrogen, halo, lower alkyl or lower alkoxy, as defined above; or
R and R° together represent 6,7-methylenedioxy;
R' represents lower alkyl of 1 to 5 carbon atoms, cycloalkyl of 3 to 6 carbon atoms; cycloalkylalkyl of 4 to 7 carbon atoms in which the cycloalkyl contains from 3 to 6 carbon atoms; allyl; methallyl; or propargyl, provided R' does not represent a tertiary alkyl in which the tertiary carbon atom is attached directly to the ring nitrogen atom;
R" represents phenyl; or substituted phenyl of the formula

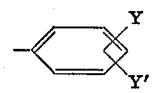

Y represents halo of atomic weight of from 18 to 80; lower alkyl of from 1 to 3 carbon atoms, lower alkoxy of from 1 to 3 carbon atoms, or trifluoromethyl;
Y' represents hydrogen, halo of atomic weight from 18 to 80, lower alkyl of 1 to 3 carbon atoms or lower alkoxy of 1 to 3 carbon atoms, which comprises reacting a 2-substituted aminobenzophenone of the Formula II

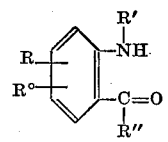

(II)

in which R, R°, R' and R" are as defined above, with urea in the presence of a saturated mono-carboxylic acid of 2 to 4 carbon atoms at a temperature of at least 80° C. the mol ratio of urea to aminobenzophenone being at least 3:1 and the mol ratio of carboxylic acid to urea being at least 2:1.

2. A process for the preparation of a compound of the formula

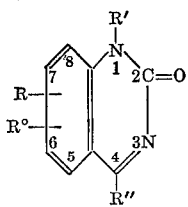

wherein

R represents hydrogen, halo of atomic weight of from 18 to 80; lower alkyl of 1 to 3 carbon atoms; lower alkoxy of 1 to 3 carbon atoms; nitro; lower alkylthio of 1 to 3 carbon atoms; or trifluoromethyl;

R° represents hydrogen, halo, lower alkyl or lower alkoxy, as defined above; or

R and R° together represent 6,7-methylenedioxy;

R' represents lower alkyl of 1 to 5 carbon atoms, cycloalkyl of 3 to 6 carbon atoms; cycloalkylalkyl of 4 to 7 carbon atoms in which the cycloalkyl contains from 3 to 6 carbon atoms; allyl; methallyl; or propargyl, provided R' does not represent a tertiary alkyl in which the tertiary carbon atom is attached directly to the ring nitrogen atom;

R'' represents phenyl; or substituted phenyl of the formula

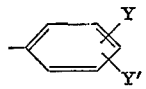

Y represents halo of atomic weight of from 18 to 80; lower alkyl of from 1 to 3 carbon atoms, lower alkoxy of from 1 to 3 carbon atoms, or trifluoromethyl;

Y' represents hydrogen, halo of atomic weight from 18 to 80, lower alkyl of 1 to 3 carbon atoms or lower alkoxy of 1 to 3 carbon atoms, which comprises reacting a 2-substituted aminobenzophenone of the Formula II

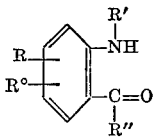

in which R, R°, R' and R'' are as defined above, with urea in the presence of a mono-carboxylic acid of 2 to 4 carbon atoms selected from the group consisting of acetic acid and propionic acid at a temperature of at least 80° C. the mol ratio of urea to aminobenzophenone being at least 3:1 and the mol ratio of carboxylic acid to urea being at least 2:1.

3. The process of claim 2 wherein the reaction temperature is in the range of 80° to 160° C.

4. The process of claim 2 wherein the mol ratio of urea to aminobenzophenone is in the range of 5:1 to 10:1.

5. The process of claim 2 wherein the mono carboxylic acid is acetic acid.

6. The process of claim 2 wherein the mol ratio of mono carboxylic acid to urea is in the range of from 4:1 to 10:1.

7. The process of claim 2 wherein the compound of Formula II is 2-N-isopropylamino-4-methyl benzophenone.

References Cited

UNITED STATES PATENTS 3,547,921   12/1970   Hardtmann et al. ____ 260—251

OTHER REFERENCES

Armarego, "Fused Pyrimidines—Pt. I—Quinazolines," Interscience Publishers (1967), p. 70.

NICHOLAS S. RIZZO, Primary Examiner

R. V. RUSH, Assistant Examiner

U.S. Cl. X.R.

260—570 AB; 424—251